US009226002B2

(12) United States Patent
Huang

(10) Patent No.: US 9,226,002 B2
(45) Date of Patent: Dec. 29, 2015

(54) METHOD, DEVICE AND SYSTEM FOR REALIZING BROADCAST TV

(71) Applicant: Huawei Technologies Co., Ltd., Shenzhen, Guangdong (CN)

(72) Inventor: Yong Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/274,297

(22) Filed: May 9, 2014

(65) Prior Publication Data

US 2014/0250451 A1    Sep. 4, 2014

Related U.S. Application Data

(63) Continuation of application No. 12/419,816, filed on Apr. 7, 2009, now abandoned, which is a continuation of application No. PCT/CN2008/070480, filed on Mar. 12, 2008.

(30) Foreign Application Priority Data

Apr. 6, 2007   (CN) .......................... 2007 1 0100409
May 17, 2007   (CN) .......................... 2007 1 0107042

(51) Int. Cl.
*H04N 21/234*   (2011.01)
*H04L 12/14*   (2006.01)
(Continued)

(52) U.S. Cl.
CPC .............. *H04N 21/234* (2013.01); *H04L 12/14* (2013.01); *H04L 12/1471* (2013.01);
(Continued)

(58) Field of Classification Search
CPC .......... H04N 21/234; H04N 21/25816; H04N 21/6125; H04N 21/64322; H04N 21/2543; H04N 7/162; H04N 7/173; H04L 12/14; H04L 65/4076
See application file for complete search history.

(56) References Cited

U.S. PATENT DOCUMENTS 6,016,141 A    1/2000   Knudson et al.
6,639,943 B1   10/2003  Radha et al.
(Continued)

FOREIGN PATENT DOCUMENTS

CN    1783831 A    6/2006
CN    1859179 A    11/2006
(Continued)

OTHER PUBLICATIONS

1st Office Action in corresponding European Application No. 08715216.1 (Jun. 6, 2011).
(Continued)

*Primary Examiner* — Pinkal R Chokshi
(74) *Attorney, Agent, or Firm* — Leydig, Voit & Mayer, Ltd.

(57) ABSTRACT

A method for realizing video live broadcast, includes: receiving a request for creating conversation from a user equipment, the request carrying indication information for identifying video live broadcast BTV service packet, the BTV packet includes several channel program with the same authorization attribute and the same accounting attribute; sending BTV service control information corresponding to BTV service packet to a network marginal equipment corresponding to the user equipment UE; creating the conversation between a IPTV server and the user equipment UE according to the request; sending the channel program that the UE need access to the UE according to the BTV service control information. Corresponding equipment and system also are provided. The invention can ensure flexible authorization and accounting capability, meanwhile it also ensure the user can switch channel quickly according to the present invention.

12 Claims, 4 Drawing Sheets

(51) Int. Cl.
*H04L 12/18* (2006.01)
*H04N 7/173* (2011.01)
*H04N 21/222* (2011.01)
*H04N 21/438* (2011.01)
*H04N 21/4788* (2011.01)
*H04N 21/61* (2011.01)
*H04N 21/643* (2011.01)
*H04L 29/06* (2006.01)
*H04N 21/258* (2011.01)

(52) U.S. Cl.
CPC ......... *H04L 12/185* (2013.01); *H04L 65/4076* (2013.01); *H04N 7/17318* (2013.01); *H04N 21/2221* (2013.01); *H04N 21/25816* (2013.01); *H04N 21/4384* (2013.01); *H04N 21/4788* (2013.01); *H04N 21/6125* (2013.01); *H04N 21/64322* (2013.01)

(56) References Cited

U.S. PATENT DOCUMENTS

| | | | |
|---|---|---|---|
| 7,562,375 | B2 | 7/2009 | Barrett et al. |
| 7,797,721 | B2 | 9/2010 | Greene et al. |
| 7,801,824 | B1 | 9/2010 | Bryar et al. |
| 7,895,126 | B1 | 2/2011 | Ritter et al. |
| 7,956,900 | B2 | 6/2011 | Itoh |
| 2002/0147791 | A1* | 10/2002 | Choi ............................. 709/217 |
| 2002/0170053 | A1 | 11/2002 | Peterka et al. |
| 2005/0028206 | A1* | 2/2005 | Cameron et al. ................ 725/46 |
| 2005/0034150 | A1* | 2/2005 | Muraoka ........................ 725/31 |
| 2005/0039205 | A1* | 2/2005 | Riedl ............................. 725/32 |
| 2005/0220132 | A1* | 10/2005 | Oman et al. ................... 370/432 |
| 2006/0107286 | A1* | 5/2006 | Connor et al. ................. 725/31 |
| 2006/0117342 | A1* | 6/2006 | Park et al. ...................... 725/37 |
| 2006/0184982 | A1* | 8/2006 | Paz et al. ....................... 725/88 |
| 2006/0225108 | A1 | 10/2006 | Tabassi et al. |
| 2006/0233171 | A1* | 10/2006 | Murray et al. ................ 370/390 |
| 2006/0235800 | A1* | 10/2006 | Furlong et al. ................ 705/59 |
| 2007/0074240 | A1 | 3/2007 | Addington et al. |
| 2007/0124781 | A1* | 5/2007 | Casey et al. ................... 725/94 |
| 2007/0157248 | A1* | 7/2007 | Ellis ............................... 725/47 |
| 2007/0237072 | A1 | 10/2007 | Scholl |
| 2007/0250890 | A1* | 10/2007 | Joshi et al. ................... 725/120 |
| 2007/0283397 | A1 | 12/2007 | Scholl |
| 2007/0294735 | A1* | 12/2007 | Luo ............................... 725/93 |
| 2008/0127255 | A1* | 5/2008 | Ress et al. ..................... 725/38 |
| 2008/0163286 | A1 | 7/2008 | Rudolph et al. |
| 2008/0184302 | A1 | 7/2008 | Knudson et al. |
| 2008/0229379 | A1* | 9/2008 | Akhter ......................... 725/139 |
| 2008/0301736 | A1 | 12/2008 | Heilbron et al. |
| 2009/0133088 | A1 | 5/2009 | Kim et al. |
| 2009/0235299 | A1 | 9/2009 | Astrom et al. |
| 2010/0146552 | A1 | 6/2010 | Hassell et al. |
| 2010/0269130 | A1 | 10/2010 | Gupta |
| 2011/0276995 | A1* | 11/2011 | Alten et al. .................... 725/39 |

FOREIGN PATENT DOCUMENTS

| | | |
|---|---|---|
| CN | 1881925 A | 12/2006 |
| CN | 100551044 C | 10/2009 |
| EP | 1633144 A1 | 3/2006 |
| WO | 0245334 A1 | 6/2002 |
| WO | 2006131898 A2 | 12/2006 |

OTHER PUBLICATIONS

European Patent Office, Extended European Search Report in European Patent Application No. 08715216.1 (Jul. 8, 2010).

State Intellectual Property Office of the People's Republic of China, English Translation of Written Opinion of the International Searching Authority in International Patent Application No. PCT/CN2008/070480 (Jun. 26, 2008).

ETSI, "Telecommunications and Internet converged Services and Protocols for Advanced Networking (TISPAN); IPTV Architecture; IPTV functions supported by the IMS subsystem," Technical Specification, redlined Draft ETSI TS 182 027 V0.0.7 pp. 1-41 (Apr. 2007).

Editors, "Draft Recommendation Y.2111 (revised), Resource and admission control functions in Next Generation Networks (Version 0.2) (Beijing, China, Jan. 8-12, 2007)," Temporary Document, International Telecommunication Union, Telecommunication Standardization Sector, Study Period 2005-2008, Study Group 13, TD 167 (WP 4/13), English only, Original: English -Geneva (Apr. 16-27, 2007).

Office Action in corresponding abandoned U.S. Appl. No. 12/419,816 (Sep. 28, 2011).

Office Action in corresponding abandoned U.S. Appl. No. 12/419,816 (Apr. 12, 2012).

Office Action in corresponding abandoned U.S. Appl. No. 12/419,816 (Mar. 6, 2013).

Office Action in corresponding abandoned U.S. Appl. No. 12/419,816 (Feb. 10, 2014).

* cited by examiner

US 9,226,002 B2

METHOD, DEVICE AND SYSTEM FOR REALIZING BROADCAST TV

CROSS-REFERENCE TO RELATED APPLICATIONS

This application is a continuation of U.S. patent application Ser. No. 12/419,816, filed on Apr. 7, 2009, which is a continuation of PCT application PCT/CN2008/070480, filed on Mar. 12, 2008. The International Application claims priority to Chinese Patent Application No. 200710100409.0, filed on Apr. 6, 2007 and Chinese Patent Application No. 200710107042.5, filed on May 17, 2007. The afore-mentioned patent applications are hereby incorporated by reference in their entireties.

FIELD OF THE INVENTION

The present disclosure relates to the network communication technology field and in particular, to a method, device and system for realizing broadcast TV.

BACKGROUND OF THE INVENTION

With the vigorous development of INTERNET, Broadcast TV (BTV) service based on IP network emerges. BTV transfers video programs via IP network, so that a family may have the same service experience as the current TV. At the same time, by using the characteristics of IP network, more abundant functions, such as for supporting video phone, video conference, distance education and the like, may be provided on a home TV terminal.

FIG. 1 shows a network model of BTV service in the prior art. Referring to FIG. 1, BTV service is transferred in an IP network from a head-end to a home in multicast mode. Inside the home, video stream is transferred to TV terminals with a set-top box (STB) via a home gateway.

FIG. 2 shows a network model for realizing BTV service in the prior art. Referring to FIG. 2, in order to realize fast channel switching, in a technical solution of the prior art, a program authorization table of programs that may be watched by a user is installed in advance to a digital subscriber line access multiplexer (DSLAM) closest to the user (in step 1a of FIG. 2, a program authorization table is configured statically via the configuration policy of an operation support system (OSS) or a policy server;

Alternatively, in step 1a' of FIG. 2, a user registers on an IPTV service management system, and in step 1b', the IPTV service management system issues the user policy to the edge device and dynamically issues a program authorization table). After obtaining the program authorization table, the DSLAM queries the program authorization table to determine whether to allow a user to watch the corresponding program according to a request sent by the user for joining a channel. If the user passes the verification, a multicast media stream requested will be replicated to the corresponding user port. In addition, if quality of service (QoS) needs to be guaranteed, the DSLAM will request a resource server to reserve a corresponding bandwidth resource for the multicast media stream (in FIG. 2, resource reservation request in step 3, and resource reservation response in step 4). If the corresponding multicast stream does not reach the DSLAM in advance, the DSLAM device will upload the IGMP request message to a BNG device to establish a transfer channel. Or, the resource server establishes a multicast channel with QOS guaranteed to the DSLAM.

The above technical solution can realize fast channel switching. But because the program access authorization table of a user is issued to the DSLAM in one go, there lacks detail and flexible program control on the user. For example, IPTV service operator may wish to control the number and content of programs that may be watched by a family at the same time, or to control different authorizations granted to different users of the same family, then the control force of such a simple control table is rather limited.

FIG. 3 shows another network model for realizing BTV service in the prior art. Referring to FIG. 3, FIG. 3 shows the second method for realizing BTV service in the prior art, which includes the following steps:

1. A User Equipment (UE) sends a service request to an IPTV server for establishing a session;
2. After the IPTV server authorizes the service request of the user, it sends a request to a policy/resource control server;
3. The policy/resource control server performs admission control on the network resource and controls a bearer network to establish a multicast channel with QOS guaranteed;
4. The media stream is issued to the UE via the multicast channel established;
4'. The policy/resource control server responds to the request of the IPTV server;
5. The IPTV server responds to the user via a business layer session.

In this solution, the user service authorization policy is put on a centralized server and every channel request needs to be handled by the server. This mode of 'centralized control' will cause much delay in reality and thus it is difficult to realize fast channel switching.

SUMMARY OF THE INVENTION

The embodiments of the present disclosure provide a method, device and system for realizing Broadcast TV (BTV), and therefore not only flexible authorization and charging capability can be guaranteed, but also fast channel switching of the user may be guaranteed.

One embodiment of the present disclosure provides a method for realizing BTV, including:

receiving a session establishment request from a UE, the request carrying indication information for identifying a BTV service package, the BTV service package including several channel programs with the same authorization attribute and charging attribute;

sending, to a network edge device corresponding to the UE, BTV service control information of the corresponding BTV service package according to which the network edge device can send a channel program to be accessed by the UE to the UE.

One embodiment of the present disclosure provides an IPTV server, including:

a searching unit adapted to query a related BTV service package according to indication information corresponding to a BTV service package in a session establishment request received, the BTV service package including several channel programs with the same authorization attribute and charging attribute; and a control unit adapted to obtain the BTV service control information according to the result obtained via the searching unit by querying the related BTV service package, send the BTV service control information to a network edge device of the UE.

One embodiment of the present disclosure further provides a policy/resource control server, including:

a service unit adapted to receive BTV service control information corresponding to a BTV service package, the BTV service package including several channel programs with the same authorization attribute and charging attribute;

a converting unit adapted to convert the UE identification (ID) carried in the BTV service control information into an association ID that may be identified by the network edge device; and a sending unit adapted to send the BTV service control information carrying the association ID to the network edge device.

One embodiment of the present disclosure provides a network edge device, including:

a service unit adapted to receive BTV service control information of a BTV service package, the BTV service package including several channel programs with the same authorization attribute and charging attribute; and a switching unit adapted to control a service channel in the BTV service package according to the BTV service control information, and send a channel program to be accessed to the UE.

One embodiment of the present disclosure provides a system for realizing BTV, including:

an IPTV server adapted to query a related BTV service package, which includes several channel programs with the same authorization attribute and charging attribute, according to indication information corresponding to a BTV service package in a received session establishment request, obtain the corresponding BTV service control information, send the BTV service control information to a network edge device of a UE;

a network edge device adapted to receive an access request from the UE, and send a channel program to be accessed to the UE according to the BTV service control information from the IPTV server.

In the technical solutions provided by the present disclosure, BTV programs are divided into different BTV service packages according to the authorization attribute and charging attribute. When a user performs a switch between the channel programs included in the same BTV service package, no authorization and charging operations need to be performed; if the user wants to watch the channel contents belonging to different BTV service packages at the same time, the corresponding session connection needs to be further established; if the user wants to watch more than two channel contents belonging to the same BTV service package, the corresponding more than two session connections also need to be established. Therefore, not only flexible authorization and charging capability can be guaranteed, but also fast channel switching of the user may be guaranteed at the same time.

DETAILED DESCRIPTION OF THE EMBODIMENTS

In one embodiment of the present disclosure, an IPTV session is established between a UE and an IPTV server for requesting a BTV service package corresponding to the session, in which the service package includes a set of channel programs. All the channel programs in the service package have a uniform authorization attribute and a uniform charging attribute; in other words, no authorization and charging operations need to be performed when a user performs a switch between the channel programs included in the same service package.

The IPTV server issues the BTV service package or a service package ID together with the ID of the requesting user to a network edge device near the UE. The user realizes channel switching on the network edge device using an IGMP protocol. The IPTV server sends and receives a keepalive message with the UE on the session. When the IPTV detects that the user session is interrupted, it operates the network edge device to abort the authorization on the corresponding BTV service package of the corresponding user.

In conclusion, the total BTV service that may be consumed by a user is subdivided into BTV service packages. The IPTV server may realize authorization and charging functions on one BTV service package of the user via a session. At the same time, the online state of the UE may be real time monitored via a session. Fast channel switching may be guaranteed by processing the IGMP request of a UE via a network edge device, and the network edge device only processes channel switching in the same BTV service package. In the same premises, when the same or different UEs want to watch different program classes (which correspond to different BTV service packages), a new session needs to be further initiated. The new session will activate another BTV service package to the network edge device for the UE.

Most typically, BTV service corresponds to a set of basic channels that may be watched by a user. When two terminals in a home need to watch two different programs belonging to the same set of basic channels, two sessions need to be established for realizing charging control.

Figure 1:
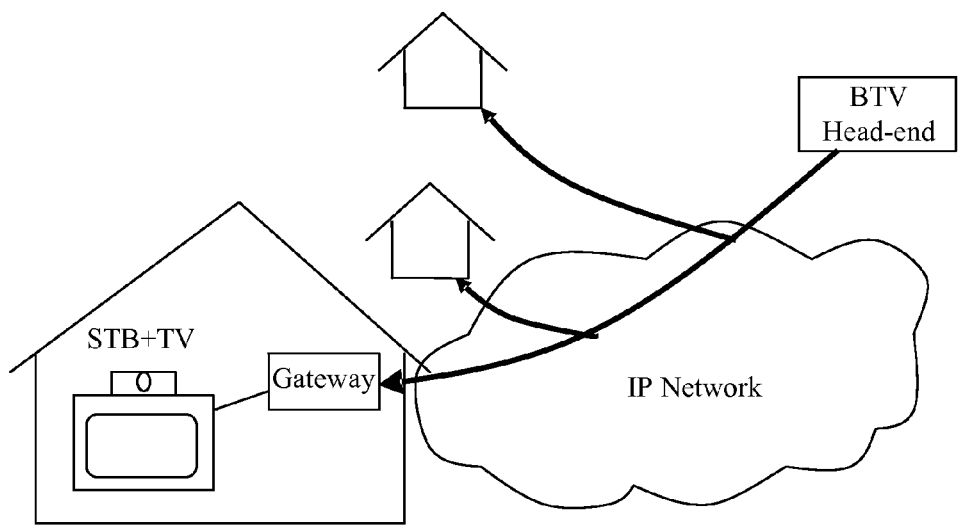
FIG. 1 is a network model of BTV service in the prior art.
Figure 2:
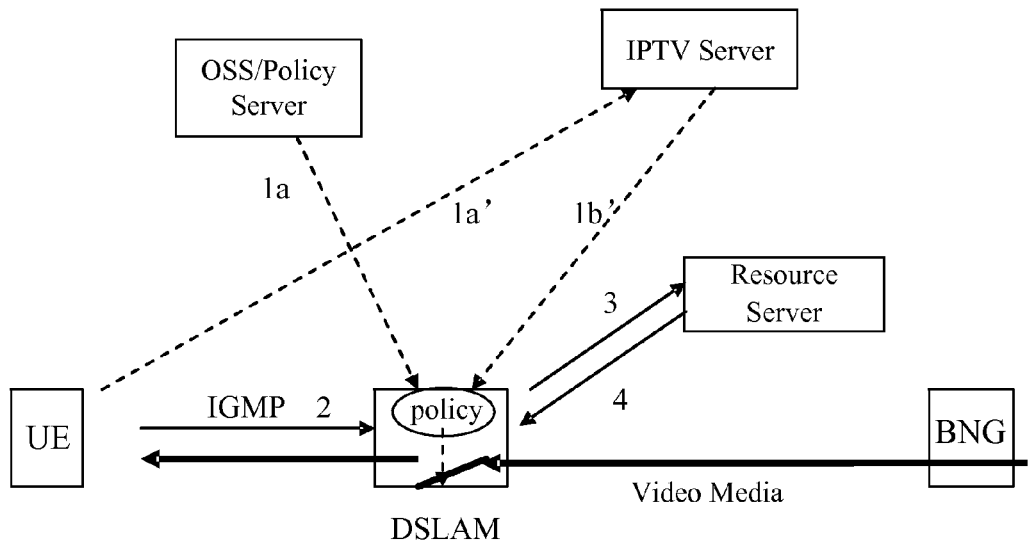
FIG. 2 is a network model for realizing BTV service in the prior art.
Figure 3:
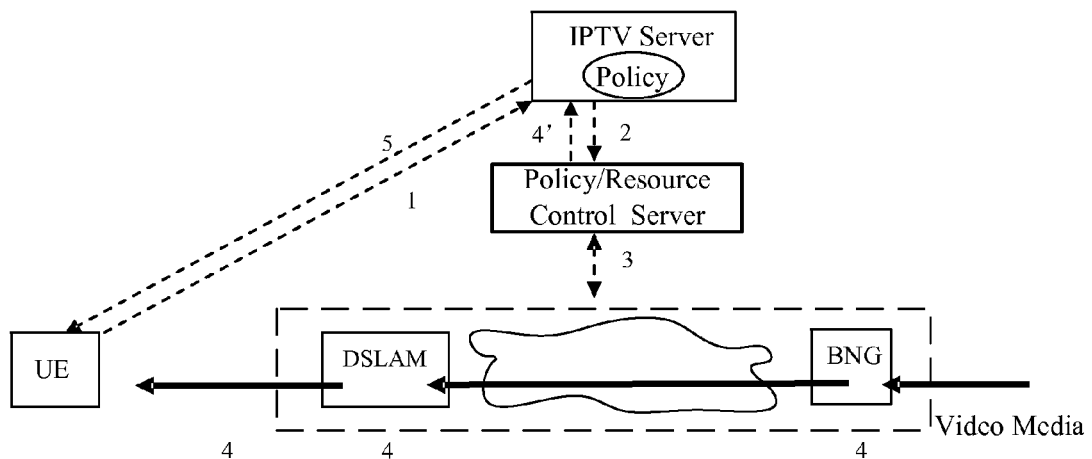
FIG. 3 is another network model for realizing BTV service in the prior art.
Figure 4:
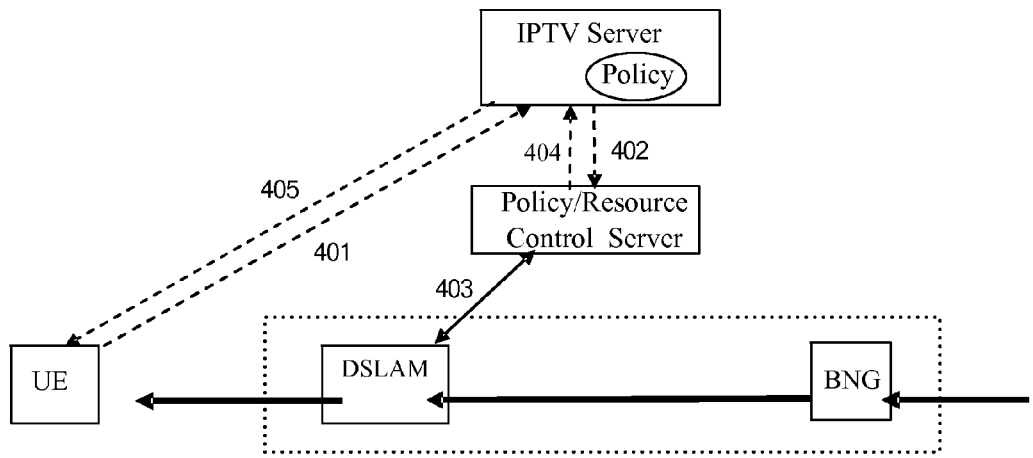
FIG. 4 is a schematic diagram for establishing a session according to one embodiment of the present disclosure.

FIG. 4 is a schematic diagram for establishing a session according to this embodiment. Referring to FIG. 4, when a user applies for watching a channel program:

In step 401, a UE initiates a session establishment request which carries the program ID to be watched or the BTV service package ID to which the program belongs, so that an IPTV server may find the BTV service package requested by the UE.

In step 402, the IPTV server authorizes the service accessed by the user and initiates a request to a policy/resource control server after the authorization is passed, and the request carries the ID of at least one BTV service package (here, the BTV service package may also be directly carried in the request; in consideration of operation management, the operator will partition relatively fixed BTV service packages to a user group; at this time, it only needs to configure the channel program content represented by each BTV service package in the network edge device in advance and allocate a BTV service package ID, and when a control is issued dynamically, it only needs to carry a BTV service package ID). The request may also carry an indication for activating the BTV service package and a user ID.

In step 403, after receiving the request, the policy/resource control server converts the user ID into an association ID that may be identified by the network edge device, and the association ID is used for associating an IGMP request with corresponding BTV service package after the network edge device receives the IGMP request. The association ID includes one or a combination of: an IP address of the UE, an ID of a physical port on which the user exists, an ID of a logic port on which the user exists and a MAC address of the UE. The policy/resource control server sends a message to the network edge device (such as a DSLAM device). The message includes one or a combination of: indication for activating the corresponding BTV service package, BTV service package ID, BTV and association ID. After accomplishing the related installation, the edge device responds to the policy/resource control server.

In step 404, the policy/resource control server responds to the request of the IPTV server and indicates that the activation is successful.

In step 405, the IPTV server sends a session response to the UE so as to acknowledge that the user request is successful.

Optionally, between Step 402 to Step 404, the policy/resource control server reserves resources for the BTV service package requested by the user, interacts with a bearer device and establishes a transfer channel with QOS guaranteed.

Additionally, in some application scenarios, the function of converting the user ID into an association ID realized by the above policy/resource control server may be built in the IPTV server or the network edge device. Thus, the above process may be simplified as the interaction between the IPTV server and the network edge device; the request may carry the ID of at least one BTV service package, and it may further carry an indication for activating BTV service package and a user ID.

During the process in which the user watches a program, the UE sends an IGMP service package to the network edge device for joining or leaving a channel, so that channel switching may be realized. At the same time, the UE performs keepalive interaction via the session connection established with the IPTV server. At this time, the IPTV server may realize real-time charging.

Figure 5:
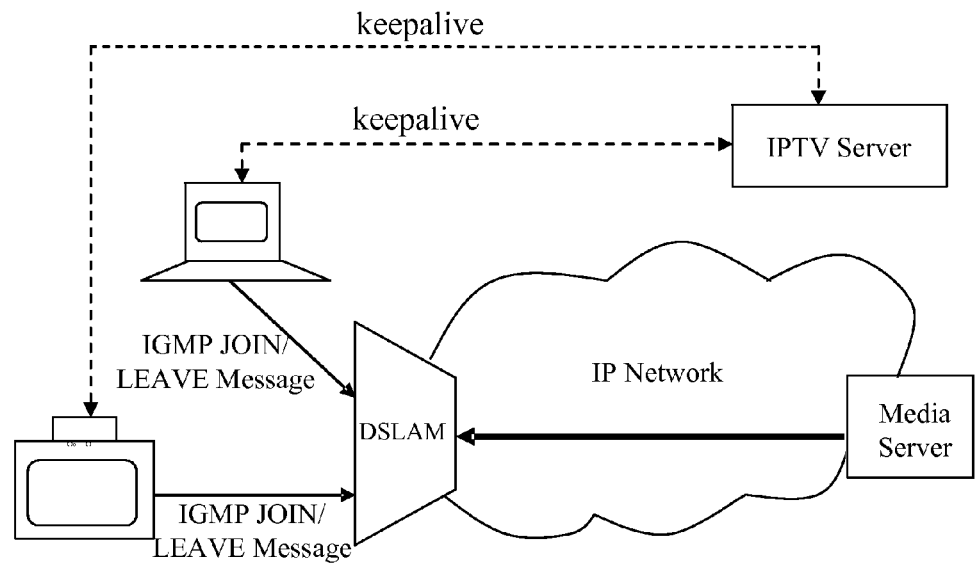
FIG. 5 is a schematic diagram for maintaining an activated BTV service package using a session according to one embodiment of the present disclosure.

FIG. 5 is a schematic diagram for maintaining an activated BTV service package using a session according to this embodiment. Referring to FIG. 5, an IPTV server allows corresponding user to consume a BTV service package corresponding to a session only when the session is in online state.

When the user sends an IGMP JOIN/LEAVE message to a network edge device, the process will be illustrated as follows by taking a DSLAM as an example.

When receiving an IGMP JOIN message, a DSLAM performs the following steps.

In step 501, the DSLAM extracts an association ID according to the IGMP JOIN packet and the ID information of the physical and logic ports from which the packet comes.

In step 502, the DSLAM searches whether there are the same association ID activated; if not, the packet is discarded and the process ends; if yes, it further determines whether the association ID establishes a corresponding relationship with a channel program of corresponding BTV service package (if a corresponding relationship is established, it indicates that the user with the activated association ID has requested the corresponding service stream), if not, it proceeds to Step 503; if yes, the packet is discarded and the process ends.

In step 503, the DSLAM records each activation of the association ID (the same association ID may be activated more than once, and it indicates that there are a plurality of terminals for watching the program at the same time in the home, or one home terminal needs to watch more than two programs at the same time) and the watched channel program corresponding to each activated association ID. The DSLAM searches whether the requested channel program (which is embodied as a multicast address or a <multicast address, video source address>two-tuple) is in a BTV service package associated with the association ID. If yes, the channel program service stream of the corresponding request is sent to the port on which the user exists, and a corresponding relationship between the corresponding association ID and the sent channel program service stream is established at the same time; if not, the packet is discarded.

In step 504, the process ends.

When receiving an IGMP LEAVE message, the DSLAM performs the following steps.

In step 511, the DSLAM extracts the association ID according to the IGMP LEAVE packet and the ID information of the physical and logic ports from which the packet comes.

In step 512, the DSLAM searches whether there are the same association ID activated, and finds the corresponding BTV service package. If yes, it proceeds to Step 513; if not, the packet is discarded and the process ends.

In step 513, the DSLAM determines whether the channel program requested to leave establishes an association with the association ID. If yes, it stops the sending of the corresponding channel program stream and deletes the association between the channel program stream and the association ID; if not, it discards the packet.

In step 514, the process ends.

For the above process, when the user performs a switch from channel 1 to channel 2, IGMP LEAVE of channel 1 should be sent first, and IGMP JOIN of channel 2 will be sent next.

The above processes within the DSLAM are only used to subsidiarity illustrate the overall solution of the embodiment. Many other solutions may further be used in specific realization process. For example, when the DSLAM only receives an IGMP LEAVE packet but no IGMP JOIN packet, the user program may be interrupted; and the DSLAM may send a default channel just after a new BTV service package is activated, and no operation will be performed unless an IGMP LEAVE packet and an IGMP JOIN packet with the same association ID are received in a certain time period, thus the user may be allowed to issue the two packets in any order, and a case that a user program is interrupted may be avoided. This will not be again described in detail here.

Figure 6:
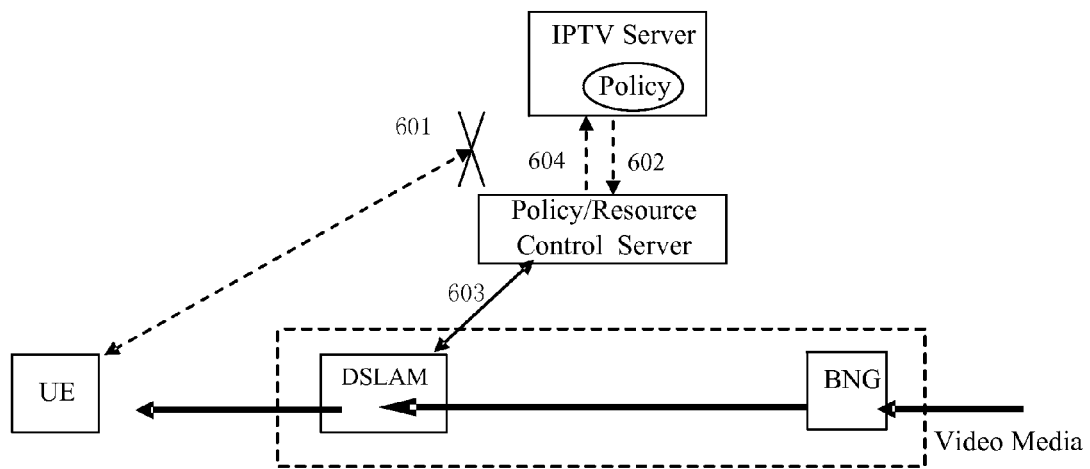
FIG. 6 shows a processing procedure when a session is interrupted/aborted according to one embodiment of the present disclosure.

FIG. 6 shows a processing procedure when a session is interrupted/aborted according to this embodiment. When an IPTV server detects that a session is interrupted (no keepalive packet is received in a certain time period) or when a user initiatively requests to abort the session, the following steps will be performed (taking session interruption as an example), as shown in FIG. 6.

In step 601, an IPTV service controller detects a session interruption.

In step 602, the IPTV server finds a BTV service package associated with the session and sends a request message to a resource policy server. The request message carries an indication for deactivating a BTV service package, a BTV service package ID and a user ID.

In step 603, after receiving the request message, a policy/resource control server converts the user ID into an association ID that could be recognized by the network edge device. The policy/resource control server sends a message to the network edge device (such as a DSLAM device). The message includes one or a combination of: an indication for deactivating the corresponding BTV service package, a BTV service package ID and an association ID. After deleting the related association ID, the network edge device responds to the policy/resource control server.

In step 604, the policy/resource control server responds to the request of the IPTV server for indicating that deactivation is successful.

The solutions of the present disclosure realizes the control on user BTV service via a session, and therefore not only flexible authorization and charging capability can be guaranteed, but also fast channel switching of the user may be guaranteed at the same time.

Figure 7:
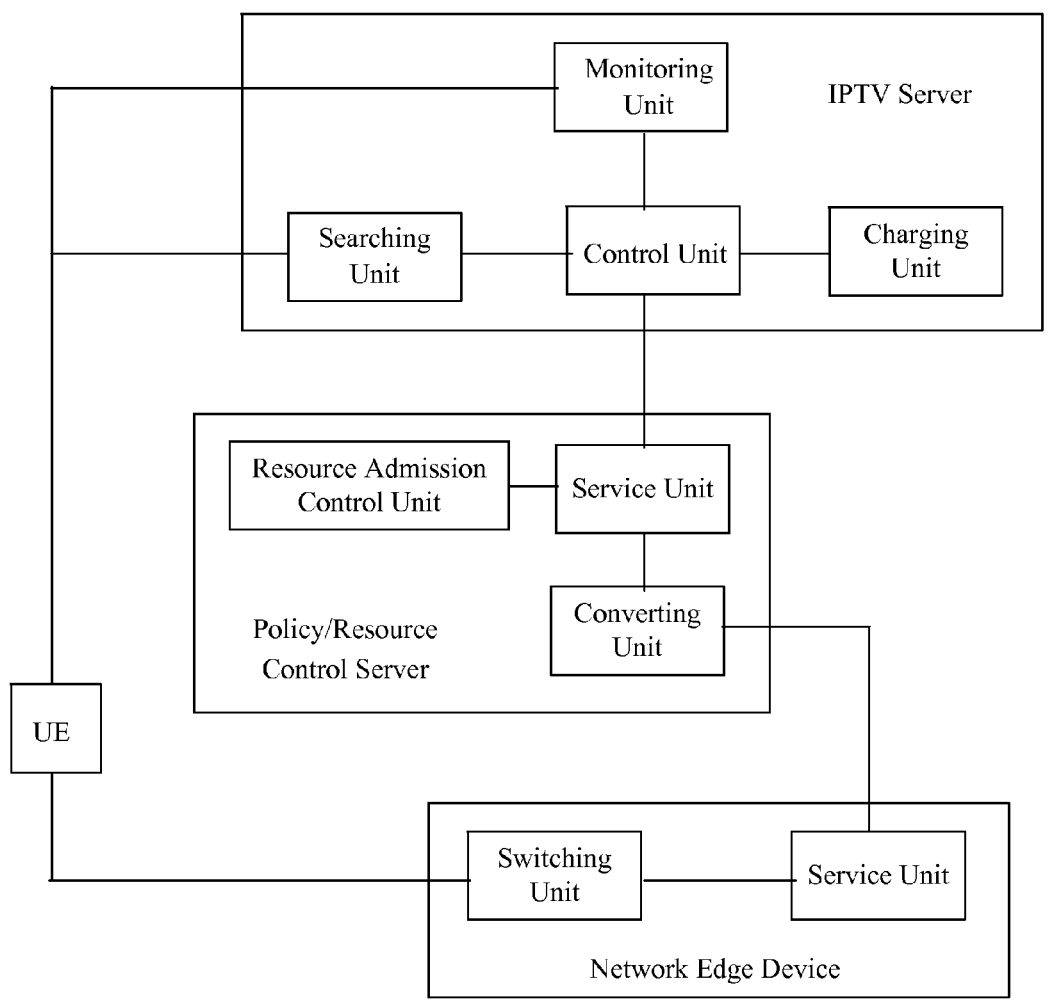
FIG. 7 is a structural representation of the system for realizing BTV according to one embodiment of the present disclosure.

FIG. 7 is a structural representation of the system for realizing BTV according to this embodiment. Referring to FIG. 7, the system for realizing BTV includes: an IPTV server adapted to search corresponding BTV service control information according to a session establishment request received and establishing a session with a UE, in which the BTV service control information corresponds to a BTV service package, and the BTV service package includes several channel programs with the same authorization attribute and charging attribute; a network edge device adapted to receive an access request from the UE, and send the channel program to be accessed to the UE according to the received BTV service control information.

The IPTV server includes: a searching unit adapted to search BTV service package according to an received indication information of the BTV service package in the session establishment request, in which the BTV service package includes several channel programs with the same authorization attribute and charging attribute; and a control unit adapted to send BTV service control information to the network edge device of a UE according to a searching result of the BTV service package, and establish a session with a UE.

The IPTV server may further include: a charging unit adapted to charge each channel program watched by a user according to a charging attribute during the session.

The IPTV server may further include: a detecting unit adapted to monitor the session and send the detection result to the control unit, in which when the session is interrupted, the control unit controls the network edge device to abort the authorization on the corresponding BTV service package of the UE.

The IPTV server further includes a converting unit adapted to convert a UE ID carried in the BTV service control information into an association ID that may be identified by the network edge device.

The network edge device includes: a service unit adapted to receive BTV service control information, in which the BTV service control information corresponds to a BTV service package, and the BTV service package includes several channel programs with the same authorization attribute and charging attribute; and a switching unit adapted to receive an access request from a UE, and send a channel program to be accessed to the UE according to the BTV service control information.

The network edge device may further include a converting unit adapted to convert the UE ID carried in the BTV service control information into an association ID that may be identified by the network edge device.

The converting unit may further be set in an IPTV server. Optionally, the converting unit may further be set in a policy/resource control server.

The policy/resource control server includes: a service unit adapted to receive BTV service control information, in which the BTV service control information corresponds to a BTV service package, and the BTV service package includes several channel programs with the same authorization attribute and charging attribute; and a converting unit adapted to send the BTV service control information carrying the association ID to the network edge device after converting the UE ID carried in the BTV service control information into an association ID that may be identified by the network edge device.

Moreover, the policy/resource control server may further include a resource admission control unit adapted to reserve a corresponding bandwidth resource for the BTV service package according to the bandwidth information corresponding to the BTV service package.

It may be appreciated by those of ordinary skill in the art that part or all of the steps in the method for realizing the above embodiments may be accomplished by instructing related hardware via a program. The program may be stored in a computer-readable storage media. The process for performing the program includes: receiving a session establishment request which carries indication information for identifying a BTV service package, in which the BTV service package includes several channel programs with the same authorization attribute and charging attribute; sending the BTV service control information corresponding to the BTV service package to the network edge device of the UE, and establishing a session with the UE. The storage media includes, for example, ROM/RAM, magnetic disc and compact disc.

The method, device and system for realizing BTV according to the present disclosure have been illustrated in detail above. The principles and embodiments of the present disclosure have been described with specific examples, but the above embodiments are only used for better understanding of the method of the present disclosure. At the same time, various modifications and variations may be made by those skilled in the art without departing from the scope of the present disclosure as defined by the appended claims and their equivalents. Therefore, the present disclosure in its broader aspects is not limited to the specific details and representative embodiments shown and described herein.

What is claimed is:

1. A method for realizing a Broadcast TV (BTV) service, comprising:
    subdividing, by an Internet Protocol Television (IPTV) server, total BTV service to be consumed into different BTV service packages, and allocating a BTV service package ID for each BTV service package, wherein each BTV service package comprises multiple channel programs with the same authorization attribute and the same charging attribute;
    sending, by the IPTV server, the BTV service package IDs to a User Equipment (UE) and a network edge device corresponding to the UE;
    configuring, by an operator device, channel program content of each BTV service package in the network edge device;
    receiving, by the IPTV server, from the UE, a first session establishment request for establishing a first session, the first session establishment request carrying indication information for identifying a first BTV service package, and the first session establishment request requests the IPTV server to establish a session between the IPTV server and the UE in which the UE and the IPTV server know each other's status by periodically sending keepalive packets to each other, wherein the IPTV server realizes authorization and charging functions on the first BTV service package via the first session, and wherein an online state of the UE is monitored in real-time via the first session;
    sending, by the IPTV server, after authorizing a first channel program in the first BTV service package requested to access by the UE, to the network edge device, BTV service control information for identifying the first BTV service package so as to activate the first BTV service package, wherein the BTV service control information includes a BTV service package ID, a UE ID, and an indication for activating a BTV service package;

establishing, by the IPTV server, the first session between the IPTV server and the UE to perform charging to the first channel program;

receiving, by the network edge device, a first IGMP JOIN message from the UE; and searching, by the network edge device, the first channel program in the first BTV service package, and sending the first channel program in the first BTV service package to the UE;

wherein when the UE requests to access a second channel program in the first BTV service package, neither authorization nor charging operations are performed by the IPTV device, and sending the association ID to the network edge device so as to associate an IGMP request of the UE with a BTV service package that corresponds to the association ID.

2. The method according to claim 1, wherein when the UE requests to access more than two channel programs belonging to the same BTV service package at the same time, more than two corresponding sessions are established.

3. The method according to claim 1, wherein the BTV service control information comprises a BTV service package.

4. The method according to claim 1, further comprising: converting the UE ID into an association ID that is identified by the network edge server, and sending, by the network edge device, the second channel program to the UE; and wherein when the UE requests to access a third channel program in a second BTV service package:

sending, by the UE, a second session establishing request for establishing a second session, the second session establishing request carrying indication information for identifying the second BTV service package, sending, by the IPTV server, after authorizing the third channel program in the second BTV service package requested to access by the UE, to the network edge device, BTV service control information for identifying the second BTV service package so as to activate the second BTV service package, establishing, by the IPTV server, the second session between the IPTV server and the UE to perform charging to the third channel program, receiving, by the network edge device, a second IGMP JOIN message from the UE, searching, by the network edge device, the third channel program in the second BTV service package, and sending, by the network edge device, the third channel program in the second BTV service package to the UE.

5. The method according to claim 4, wherein the association ID comprises at least one of: an IP address of the UE, an ID of a physical port on which the UE exists, an ID of a logic port on which the UE exists and a media access control (MAC) address of the UE.

6. The method according to claim 1, further comprising: reserving bandwidth resources for the BTV service package according to bandwidth information, wherein the BTV service control information comprises the bandwidth information of the BTV service package.

7. The method according to claim 1, further comprising: monitoring the session to determine that the session is interrupted, and controlling the network edge device to abort authorization on the BTV service package of the UE when the session is interrupted.

8. The method according to claim 7, wherein the session is determined to be interrupted when the UE is shut down; the UE fails; or the UE requests to abort the session.

9. An IPTV server, comprising:

a memory storing instructions thereon; and processor coupled to the memory and implements the instructions to:

subdivide total BTV service to be consumed into different BTV service packages, and allocate a BTV service package ID for each BTV service package, wherein each BTV service package comprises multiple channel programs with the same authorization attribute and the same charging attribute;

send the BTV service package IDs to a User Equipment (UE) and a network edge device corresponding to the UE;

receive from the UE, a first session establishment request for establishing a first session, the first session establishment request carrying indication information for identifying a first BTV service package, and the first session establishment request requests the IPTV server to establish a session between the IPTV server and the UE in which the UE and the IPTV server know each other's status by periodically sending keepalive packets to each other, wherein the IPTV server realizes authorization and charging functions on the first BTV service package via the first session, and wherein an online state of the UE is monitored in real-time via the first session;

send, after authorizing a first channel program in the first BTV service package requested to access by the UE, to the network edge device, BTV service control information for identifying the first BTV service package so as to activate the first BTV service package, wherein the BTV service control information includes a BTV service package ID, a UE ID, and an indication for activating a BTV service package; and establish the first session between the IPTV server and the UE to perform charging to the first channel program, wherein the network edge device receives a first IGMP JOIN message from the UE, searches the first channel program in the first BTV service package, and sends the first channel program in the first BTV service package to the UE;

wherein when the UE requests to access a second channel program in the first BTV service package, neither authorization nor charging operations need to be performed by the IPTV server, and sending, by the network edge device, the second channel program to the UE; and wherein when the UE requests to access a third channel program in a second BTV service package:

the UE sends a second session establishing request for establishing a second session, the second session establishing request carrying indication information for identifying the second BTV service package, the IPTV server sends, after authorizing the third channel program in the second BTV service package requested to access by the UE, to the network edge device, BTV service control information for identifying the second BTV service package so as to activate the second BTV service package, the IPTV server establishes the second session between the IPTV server and the UE to perform charging to the third channel program, the network edge device receives a second IGMP JOIN message from the UE, the network edge device searches the third channel program in the second BTV service package, and the network edge device sends the third channel program in the second BTV service package to the UE.

10. The IPTV server according to claim 9, wherein the processor further implements the instructions to:
convert an UE IDentification (ID) carried in the BTV service control information into an association ID that is identified by the network edge device.

11. A network edge device, comprising:
a memory storing instructions thereon; and
a processor coupled to the memory and implements the instructions to:
receive BTV (Broadcast TV) service control information for identifying a first BTV service package so as to activate the first BTV service package, wherein the first BTV service package comprises multiple channel programs with the same authorization attribute and the same charging attribute, wherein the BTV service control information includes a BTV service package ID, a UE ID, and an indication for activating a BTV service package; e;

receive a first IGMP JOIN message from a UE (User Equipment);

search for a first channel program in the first BTV service package; and send the first channel program in the first BTV service package to the UE;

wherein when the UE requests to access a second channel program in the first BTV service package, the processor further implements the instructions to send the second channel program to the UE; and wherein when the UE requests to access a third channel program in a second BTV service package, the processor further implements the instructions to: receive BTV service control information for identifying the second BTV service package so as to activate the second BTV service package, receive a second IGMP JOIN message from the UE, search the third channel program in the second BTV service package, and send the third channel program in the second BTV service package to the UE.

12. The network edge device according to claim 11, wherein the processor further implements the instructions to:
convert an UE ID (Identification) carried in the BTV service control information into an association ID that is identified by the network edge device.

* * * * *